United States Patent
Oudaltsov et al.

(10) Patent No.: US 7,072,469 B1
(45) Date of Patent: Jul. 4, 2006

(54) DEVICES FOR EMITTING OR RECEIVING SIGNALS ENCRYPTED BY DETERMINISTIC CHAOS, AND A TRANSMISSION SYSTEM, IN PARTICULAR A RADIO TRANSMISSION SYSTEM, INCLUDING SUCH DEVICES

(75) Inventors: Vladimir Oudaltsov, Metz (FR); Laurent Larger, Besancon (FR); Jean-Pierre Goedgebuer, Pouilley les Vignes (FR)

(73) Assignee: France Telecom, Paris (FR)

( * ) Notice: Subject to any disclaimer, the term of this patent is extended or adjusted under 35 U.S.C. 154(b) by 824 days.

(21) Appl. No.: 09/624,536

(22) Filed: Jul. 24, 2000

(30) Foreign Application Priority Data

Jul. 23, 1999 (FR) .................................. 99 09604

(51) Int. Cl.
*H04L 9/00* (2006.01)

(52) U.S. Cl. .................... 380/46; 380/268; 380/263

(58) Field of Classification Search ............... 380/263, 380/46

See application file for complete search history.

(56) References Cited

U.S. PATENT DOCUMENTS

| 5,379,346 | A | * | 1/1995 | Pecora et al. ............... 380/263 |
| 5,729,607 | A | * | 3/1998 | DeFries et al. ............. 380/263 |
| 6,049,614 | A | * | 4/2000 | Kim .......................... 380/263 |
| 6,704,420 | B1 | * | 3/2004 | Goedgebuer et al. ....... 380/263 |

* cited by examiner

*Primary Examiner*—Gilberto Barrón, Jr.
*Assistant Examiner*—Benjamin E. Lanier
(74) *Attorney, Agent, or Firm*—Blakely Sokoloff Taylor & Zafman (57) ABSTRACT

A sender device for sending an encrypted signal, the device comprising a chaos generator producing an encrypted electrical signal and a feedback loop comprising delayline-forming means, non-linear means, and mixer means which receive the loop signal on one input and the signal to be encrypted on another input, wherein the feedback loop includes filter-forming means which limit the spectrum of the encrypted signals to one or more spectrum bands.

10 Claims, 5 Drawing Sheets

DEVICES FOR EMITTING OR RECEIVING SIGNALS ENCRYPTED BY DETERMINISTIC CHAOS, AND A TRANSMISSION SYSTEM, IN PARTICULAR A RADIO TRANSMISSION SYSTEM, INCLUDING SUCH DEVICES

The present invention relates to techniques for encryption by deterministic chaos for providing a high level of confidentiality in transmission.

The invention is particularly advantageous in application to radio transmission.

GENERAL FIELD OF THE INVENTION AND STATE OF THE ART

In general, the encoding systems used in systems for transmitting signals that require a high degree of confidentiality rely on the use of encryption keys and algorithms that are generated by computer means. Nevertheless, that solution is not always the most suitable, particularly when it is necessary to encrypt signals with a high level of security and/or at a high data rate, because of the complexity of the algorithms that are then required. In addition, implanting such computer encoding and decoding circuits in transmission systems (for example in TV networks) runs up against problems of expense. Cost must remain low in order to satisfy the needs of commercial broadcasting on a large scale, even though the complexity of encryption must remain sufficiently high to ensure that the code cannot be broken by the means readily available to an ordinary user. It is becoming ever easier for users to obtain, legally or otherwise, software specifically adapted to decrypting standard encryption algorithms.

Methods of encoding signals by means of chaos have been studied, specifically to overcome those difficulties. In encryption by chaos, the message is hidden in a signal that is chaotic, i.e. in a signal that fluctuates in a manner that is random, but deterministic. The sender of the message possesses a chaos generator enabling the clear message to be masked in a chaotic signal. The addressee possesses another chaos generator which needs to be synchronized on the first in order to be able to decrypt the message correctly.

Various implementations have been made using electronic circuits with non-linear threshold-type elements or elements that have a hysteresis cycle, such as diodes (so-called Chua circuits).

In this context, reference can be made to the following documents:

[1] M. Storace, "Secret communication by hysteresis-based chaotic circuit", Elect. Lett., 31, 11, 1077, 1998;

[2] S. Hayes, C. Grebogi and E. Ott, "Communicating with chaos", Phys. Rev. Lett. Vol. 70, p. 3013, 1993.

Figure 1:
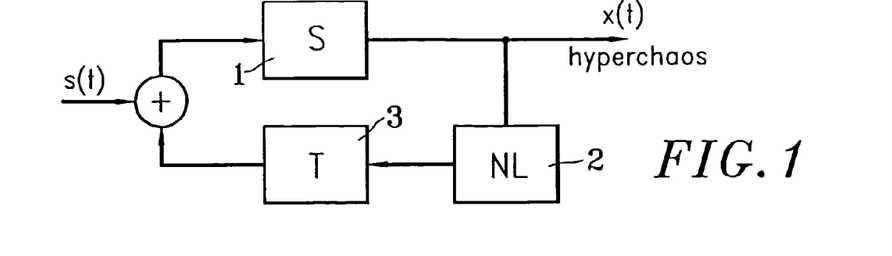
FIG. 1, discussed above, is a block diagram of a chaos generator of the non-linear time delay type.

Among the most advantageous chaos generators for use in encryption are so-called "non-linear time delay systems" (FIG. 1). They are constituted by a source 1 generating the chaotic signal x(t) and provided with a feedback loop formed by a non-linear element 2 and a delay line 3. The feedback loop physically presents a time constant τ that can be thought of as being that of a lowpass filter.

Such generators present the advantage of being simple, while producing chaos of very large dimension, known as hyperchaos, thereby making it possible to obtain a very high degree of confidentiality. Another advantage is to obtain perfect self-synchronization of the addressee chaos generator on that of the sender, thereby enabling the message to be decrypted.

Reference can be made to the following documents in which devices are made using electronic or optical components:

[3] P. Celka, "Chaotic synchronization and modulation of non-linear time-delayed feedback optical systems", IEEE Transactions on Circuits and Systems, Vol. 42, No. 8, p. 1, 1995.

[4] T. Takizawa, T. Liu and J. Ohtsubo, "Chaos in a feedback Fabry-Perot interferometer", IEEE Journal of Quantum Electronics, Vol. 30, No. 2, p. 334, 1994.

[5] A. Tamasevicius, A. Cenys, G. Mikolaitis, A. Namajunas and E. Lindberg, "Synchronization of hyperchaotic oscillators", Electr. Let., Vol. 33, No. 24, p. 2024, 1997.

[6] G. D. Van Wiggeren and R. Roy, "Communication with chaotic laser", Science, Vol. 279, p. 1198, 1998.

[7] Patent application FR 2 743 459.

[8] Patent application FR 98/06892, 1998.

[9] L. Larger, J. P. Goedgebuer, F. Delorme, "Optical encryption system using hyperchaos generated by an optoelectronic wavelength oscillator", Physical Review E, 57, 6, 1998, pp. 6618–6624.

[10] J. P. Goedgebuer, L. Larger, H. Porte, "Optical cryptosystem based on synchronization of hyperchaos generated by a delayed feedback tunable laser diode", Physical Review Letters, 80, 10, 1998, 2249.

Documents [3] and [4] describe optical hyperchaotic generators and in document [3] there is also described a synchronization method that is extremely complicated. FIG. 3 of document [5] describes electronic time delay hyperchaotic generators which can be synchronized mutually. That document does not specify how the system can be used for encrypting and decrypting signals, and whether the conditions required for synchronization are maintained in the presence of a message. Documents [6–9] propose optical hyperchaotic generators in which conditions for synchronization are obtained, as in the present invention, by the receiver making use of an open feedback hyperchaotic generator.

Figure 2:
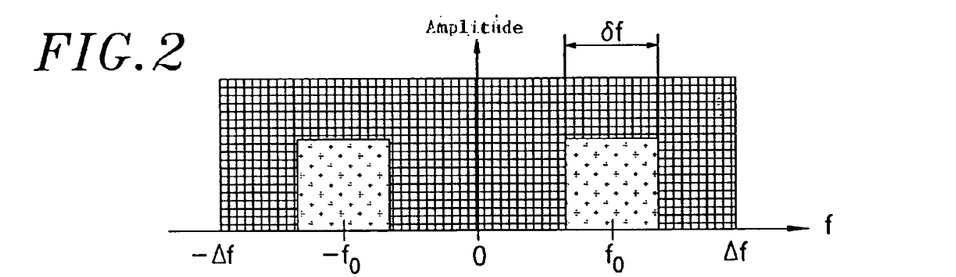
FIG. 2, also discussed above, is a graph plotting the spectrum of baseband chaos.

A problem shared by all of the hyperchaotic generators described in those documents is that they generate chaos in baseband. Baseband chaos means chaos whose spectrum is continuous over a frequency bandwidth of 2Δf centered on the frequency 0, as shown in FIG. 2. When such chaos is used for encrypting a message of bandwidth δf that is significantly smaller than Δf, then the chaos frequencies lying outside the payload bandwidth δf of the message are unused. The chaos produced by such generators therefore consumes a large amount of bandwidth, and that constitutes a major drawback in radio communications.

Radio transmissions generally make use of a very narrow band channel (e.g. having a bandwidth of 200 kHz), centered on very high carrier frequencies (e.g. a few GHz). Such operating conditions therefore differ from transmission in baseband. Thus for all of the above-cited encryption devices, the fact that they produce chaos in baseband is a disadvantage for telecommunications.

Thus, French patent applications FR 2 743 459 and FR 98/06892 describe encryption systems that make it easy to obtain self-synchronization conditions necessary to enable the receiver to decrypt the message. In such systems, and referring again to FIG. 1, the sender is a hyperchaos generator formed by an optical source 1 and a component 2 that is non-linear in wavelength or in energy inserted in a feedback loop provided with a delay line 3. Patent application FR 2 744 459 and references [3, 4, 5, 6, 9, 10] state that the variation relationship x(t) of the chaos obtained as a function of time is governed by a non-linear differential equation of the following type (cf. for example equation 1 in [7] or equation 3 in [5]):

$$x(t) + \tau \frac{d}{dt} x(t) = \beta NL[x(t-T)] \quad (1)$$

where NL is a non-linear function, P is the bifurcation parameter, and T is the time delay.

Patent FR 98/06892 discloses a different relationship of the following type (equation 1 of reference [8]):

$$\cos^{-1}\{x(t)-1\} + \tau \frac{d}{dt}\{\cos^{-1} x(t) - 1\} = \beta x(t-T) \quad (2)$$

In both of those cases, and also in the cases of the devices mentioned previously, the chaos x(t) is baseband chaos characterized by a spectrum analogous to that of white noise, as already shown in FIG. 2, with a bandwidth that extends continuously to the frequency $\Delta f = \frac{1}{2}\pi\tau$, where $\tau$ is the time constant of the feedback loop. Reference can thus be made to the figure of Reference [3] or to FIG. 3B of reference [6], or indeed to FIGS. 8 and 9 of Reference [9]. The resulting chaotic signal is asymptotic to Gaussian statistics.

Thus, when those systems are used for encrypting telecom signals at standardized data rates (e.g. 550 Mbits/s), a large fraction of the frequency spectrum of the chaos is unused. In addition to the resulting bandwidth occupation and passband costs, another drawback is that the encrypted signal is impossible to digitize. Standard analog-to-digital converters used in telecommunications are generally not suitable for working with signals in baseband. The above constitute major disadvantages for digital transmission.

Another drawback is that certain components used in digital telephony, such as vocoders, are not designed for use with signals having Gaussian statistics.

Figure 3:
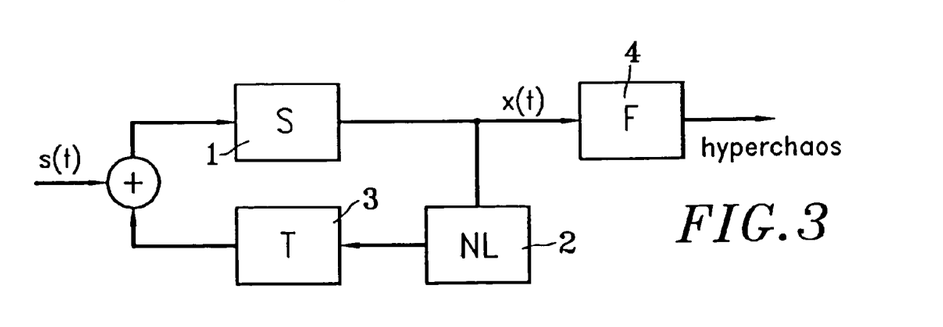
FIG. 3, also discussed above, is a block diagram of a chaos generator of the type shown in FIG. 1 and associated with a bandpass filter.

To remedy that situation, one solution for limiting the frequency band would be to insert a bandpass filter 4 at the output from the FIG. 1 sender so as to retain and transmit only the useful frequency band of the chaos signal, as shown in FIG. 3.

Unfortunately, that solution does not make it possible to obtain self-synchronization of the receiver on the sender, thus making it impossible for the receiver to decrypt the message. That solution is therefore not applicable.

SUMMARY OF THE INVENTION

The object of the invention is to remedy the above drawbacks.

The invention provides a sender device for sending an encrypted signal, the device comprising a chaos generator producing an encrypted electrical signal and a feedback loop comprising delayline-forming means, non-linear means, and mixer means which receive the loop signal on one input and the signal to be encrypted on another input, the feedback loop including filter-forming means which limit the spectrum of the encrypted signals to one or more spectrum bands.

Advantageously, said filter-forming means disposed in the feedback loop present a transfer function which distributes the chaotic signal statistically over a given spectral profile.

The invention also provides a receiver device for receiving an encrypted signal, the device comprising means for receiving said signal and a feedback loop comprising delay-line-forming means and non-linear means such that, to receive a signal encrypted by a sender device of the above-specified type, the feedback loop includes filter-forming means whose characteristics are identical to those of the filter-forming means in the feedback loop of the sender device.

The above sender or receiver devices are advantageously used in devices for transmitting and/or receiving an encrypted signal for transmission in a radio system for carrying voice signals.

The invention also provides transmission systems comprising a sender device and a complementary receiver device as defined above together with a transmission channel between said sender device and said receiver device.

With such sender devices, or receiver devices, or with such a transmission system, an encryption/decryption system using hyperchaos is made available for signals that are analog or digital, and that have spectral properties, and where appropriate statistics, that are directly compatible with those of telecommunications systems.

Such sender/receiver devices can also be integrated in structures that are simple and compact, using standard low cost electronic components, thus making mass production possible, and they can be suitable for plug-and-play applications.

By way of non-limiting examples, they can be used in wire telephony systems, in fixed or mobile radio communications systems, in data transmission systems, in portable terminals, etc.

It should also be observed that in the systems proposed by the invention, the chaotic signal used as a carrier for information has a relatively narrow spectrum band while still enabling synchronization conditions to be obtained between the sender and the receiver as is necessary in order to enable the information to be decrypted.

The level of confidentiality of the encrypted information is determined by the complexity of the chaos generated by the encryption device. The system proposed does not enable an "ordinary" user to break the encryption key even when aware of the statistical properties of the chaos used.

In practice, the key is determined by the parameters of the systems (type of non-linearity used, value of the time delay introduced in the feedback loop, spectral profile of the bandpass filter used, etc.). The precision required concerning knowledge of these parameters is such as to make it extremely difficult for a spy to perform an exhaustive search.

In an advantageous variant, a sender device can have a plurality of sender modules in cascade, each being constituted by a sender device of the above-specified type.

A device for receiving a signal encrypted by such a sender device comprises a plurality of receiver modules in cascade, each constituted by a receiver device of the type described above, said modules being the same in number as the modules of the sender device, and the filter-forming means included in the feedback loops of the receiver modules presenting characteristics that are identical to those of the filter-forming modules included in the feedback loops of the sender modules.

BRIEF DESCRIPTION OF THE FIGURES

Other characteristics and advantages of the invention appear further from the following description which is purely illustrative and non-limiting and which should be read with reference to the accompanying drawings, in which:

FIG. 9a is a circuit diagram of a decoding module adapted to the encryption module of FIG. 8a;

DESCRIPTION OF AN EMBODIMENT OF THE INVENTION

Figure 4:
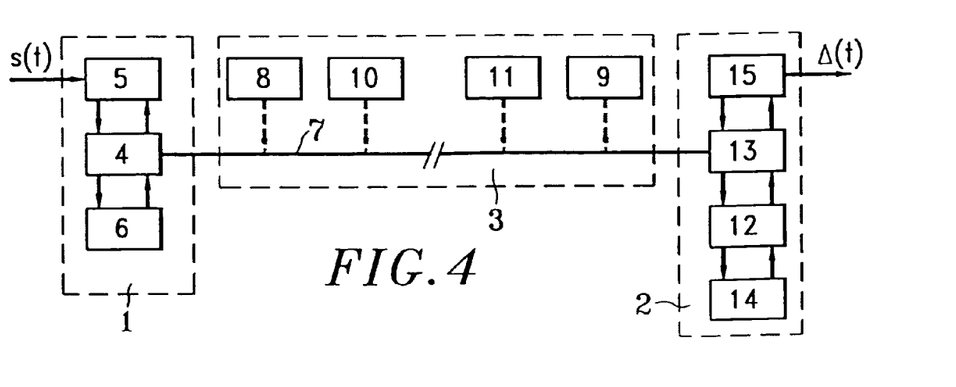
FIG. 4 is a block diagram showing a possible embodiment of the invention in general manner.

The transmission system shown in FIG. 4 comprises sender means 1 and receiver means 2 between which the signal conveying the encrypted information is conveyed by transmission means 3.

The sender means 1 comprise a chaos generator 4, an encryption system 5 for injecting the clear message s(t) into the chaos generator 4, and the filter 6 for obtaining a chaotic signal with a given frequency band and possibly with particular statistical properties.

The transmission means 3 comprise a transmission channel 7 and optionally analog-to-digital and digital-to-analog converters given respective references 8 and 9 for performing digital and analog conversion on the encrypted signal. The transmission means can thus comprise FM/AM transmitters 10 and FM/AM receivers 11 of the kind used in standard radio systems, these transmitters 10 and receivers 11 being located respectively downstream and upstream from the converters 8 and 9.

The system of FIG. 4 enables a message to be encrypted in chaos of limited bandwidth, enables the signal encrypted in this way to be converted into digital form, and enables it to be conveyed by means of a high frequency carrier by amplitude modulation, by frequency modulation, or by phase modulation. As a result said system can transfer the encrypted chaotic signal over a radio or microwave frequency band. The technical problem is that this can only be achieved if the encryption system produces chaos having very particular spectral and/or statistical properties, as already emphasized.

Figure 5:
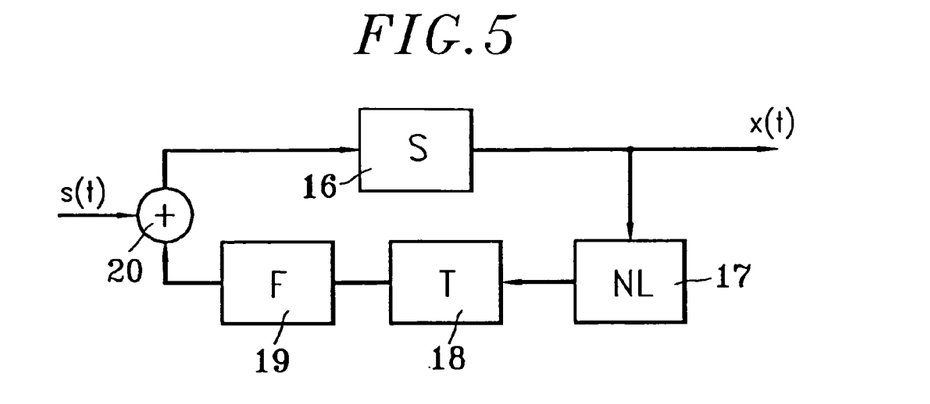
FIG. 5 is a block diagram of a possible sender device for use in the FIG. 4 device.

The structure of the sender device enabling this problem to be resolved is shown in FIG. 5.

The sender shown in this figure is constituted by a chaos generator comprising a source 16 for generating said chaos, and a feedback loop which comprises non-linear means 17, delayline-forming means 18, a bandpass filter 19 centered on the frequency $f_0$ of the message to be encrypted and of a bandwidth $\delta f$ that is slightly greater than the passband of the message s(t), and a mixer circuit 20 which mixes s(t) with the signal from the bandpass filter 19.

In this version, the mixer 20 is a summing circuit.

In another version, the time delay introduced by the means 18 can be modified by applying the message s(t) to the element 18.

The sender device can advantageously be implemented using electronic components for transmitting encrypted radio frequency signals, the source for generating the signal then being an oscillator whose frequency can be tuned electrically (i.e. a voltage-controlled oscillator or VCO), and the non-linear element can be formed by one or more active or passive bandpass filters, presenting one or more extremas.

Thus, the sender device of FIG. 5 differs from the chaos generators proposed in the publications or patent applications [1] to [10] by the fact that a bandpass filter matching the frequency band of the message is inserted in the feedback loop. As a result, the statistical and spectral properties of the chaos obtained thereby are different. It is thus possible to define the characteristics of the filter so as to generate a chaotic signal that is directly suitable for the transmission channel.

Thus, in FIG. 5, when the bandpass filter 19 is a first order electrical filter whose low and high cutoff frequencies are $f_1$ and $f_2$ respectively, the electrical signal x(t) at the outlet from the emitter is governed by a system of differential equations of the following type:

$$\begin{cases} \tau \frac{d}{dt}u(t) + u(t) + \beta NL\{x(t-T)\} \\ \frac{d}{dt}u(t) = \frac{d}{dt}x(t) + \frac{1}{\tau_2}x(t) \end{cases} \quad (3)$$

Figure 6:
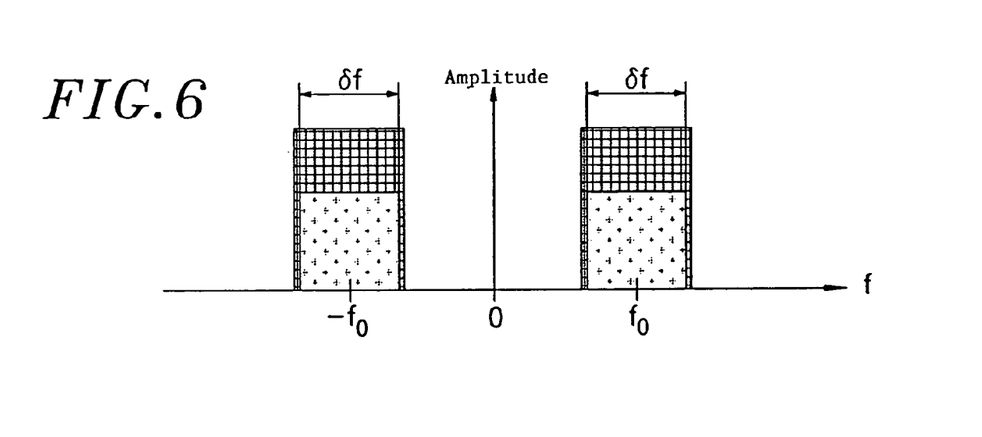
FIG. 6 is a graph plotting the spectrum of the chaos obtained with the FIG. 5 device.

These two equations can also be put into the following form:

$$x(t) + \frac{1}{\frac{1}{\tau_1} + \frac{1}{\tau_2}} \frac{d}{dt}x(t) + \frac{1}{\tau_1 + \tau_2}\int x(t)dt \quad (4)$$

$$= \frac{\tau_2}{\tau_1 + \tau_2}\beta NL\{x(t) - T)\}$$

where $\tau_1 = 1/2\pi f_1$ and $\tau_2 = 1/2\pi f_2$. The resulting chaos spectrum is a spectrum of bandwidth $\delta f = f_2 - f_1$, centered on the frequency $f_0$, as shown in FIG. 6.

Advantageously, other types of bandpass filter (second or third order filters, etc.) or a plurality of highpass and lowpass filters put into cascade can be used in the feedback loop to obtain chaotic encrypted signals characterized by band spectra having steep flanks and by statistics that are different from those of the Gaussian chaotic signals described in documents [3] to [10].

The resulting chaos x(t) and equations (3) or (4) governing it are different from the examples given in the above-mentioned patent applications FR 2 743 459 and FR 98/06892 in which the chaos must obey an equation of the (1) or (2) type. This makes it impossible to use the decrypting devices that are described therein.

Figure 7:
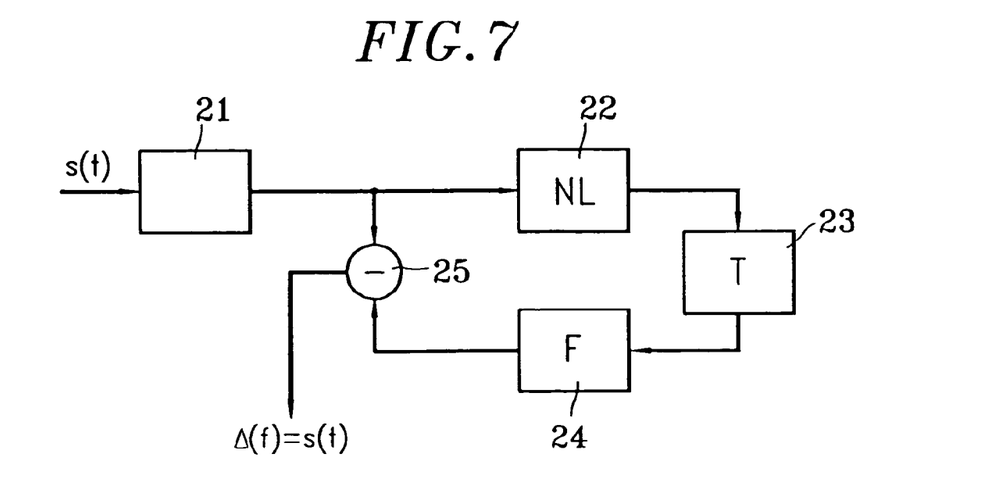
FIG. 7 is a block diagram of a receiver device suitable for use with the FIG. 5 device.

The invention also proposes a receiver device corresponding to the element 2 of FIG. 4. As shown in FIG. 7, it comprises a detector 21, non-linear means 22, delayline-forming means 23, a bandpass filter 24, and a circuit 25 which performs the operation which is the mathematical inverse of that performed by the mixer 20 contained in the sender. Thus, if the mixer 20 is an adder, the circuit 25 is a subtracter which performs subtraction Δ(t) between the signal x(t) and the signal output by the bandpass filter. If the circuit 20 is a multiplier, then the circuit 25 is a divider. The signal output by the circuit 25 constitutes the decrypted message s(t). The elements 22, 23, and 24 have characteristics that are identical to those of the elements 17, 18, and 19, respectively.

Thus, the receiver device makes it possible to obtain perfect self-synchronization of the chaos that it generates on the chaos that it receives, thereby enabling the receiver to decode the message s(t).

The receiver device shown in FIG. 7 differs from the decrypting devices proposed in particular in the publications and patent applications [1] to [10] by inserting in the feedback loop a filter 24 that is identical to the first filter 18 used in the sender device. The profile of the filter used is determined by means of equations (3) and (4) so that the spectral and statistical properties of the chaos match those of the other components included in the transmission system. Thus, in digital radio telephony, the device of the invention makes it possible to obtain chaotic signals having a frequency band and statistics that match those of voice and that are therefore adapted to standard vocoders. This enables the receiver device to self-synchronize automatically on the encrypted signal coming from the sender, and it enables the receiver to decrypt the message.

EXAMPLE

Figure 8A:
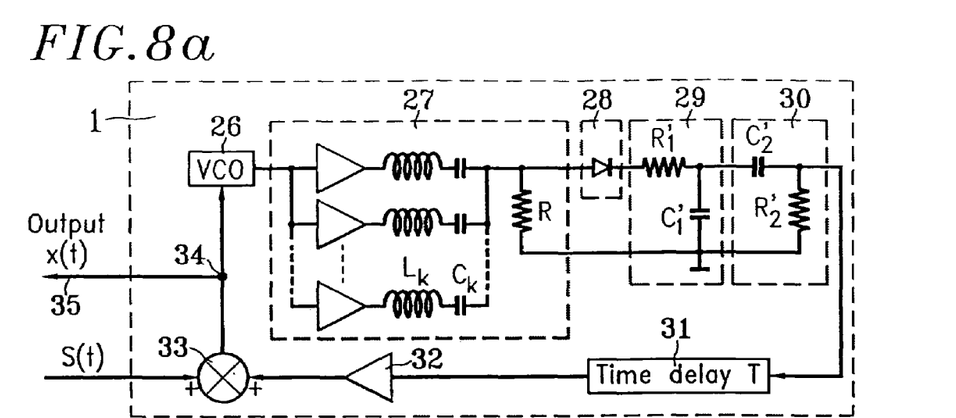
FIG. 8a is a circuit diagram of an encryption module adapted to voice signal encoding.
Figure 8B:
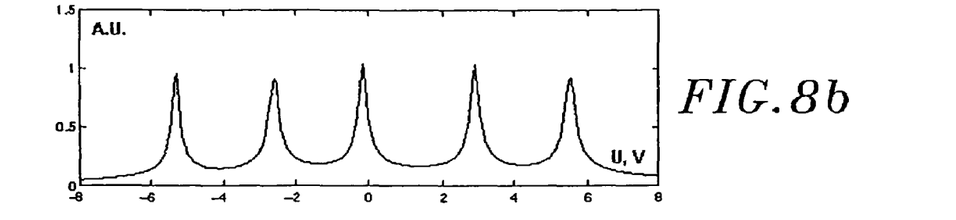
FIG. 8b is a graph plotting the non-linear function NL obtained with the five resonant circuits.
Figure 8C:
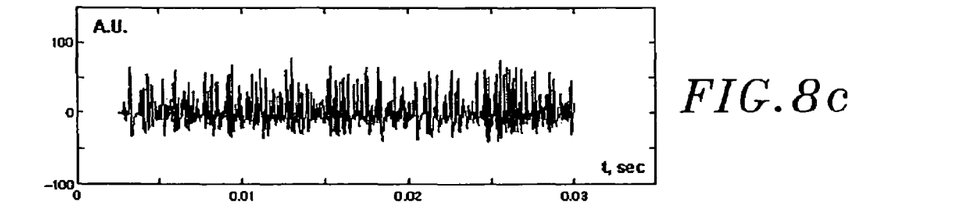
FIG. 8c is a graph plotting as a function of time an example of an encrypted signal x(t) as obtained at the outlet from the module.
Figure 8D:
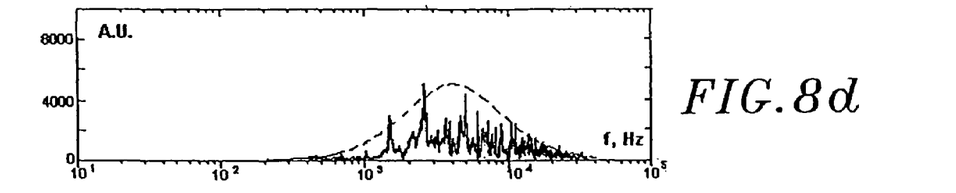
FIG. 8d is a graph plotting the spectrum of the FIG. 8c encrypted signal x(t)
Figure 8E:
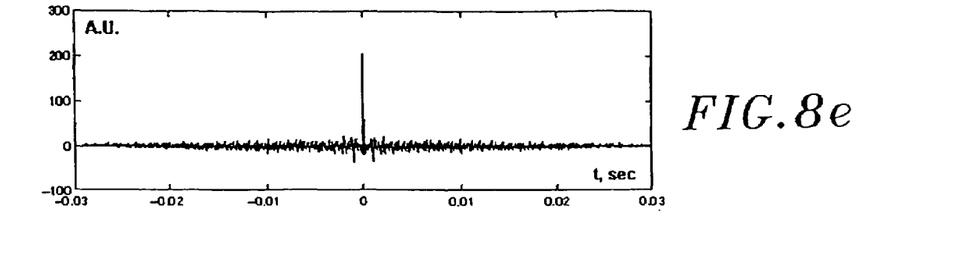
FIG. 8e is a graph plotting the self-correlation function of said signal x(t)
Figure 9A:
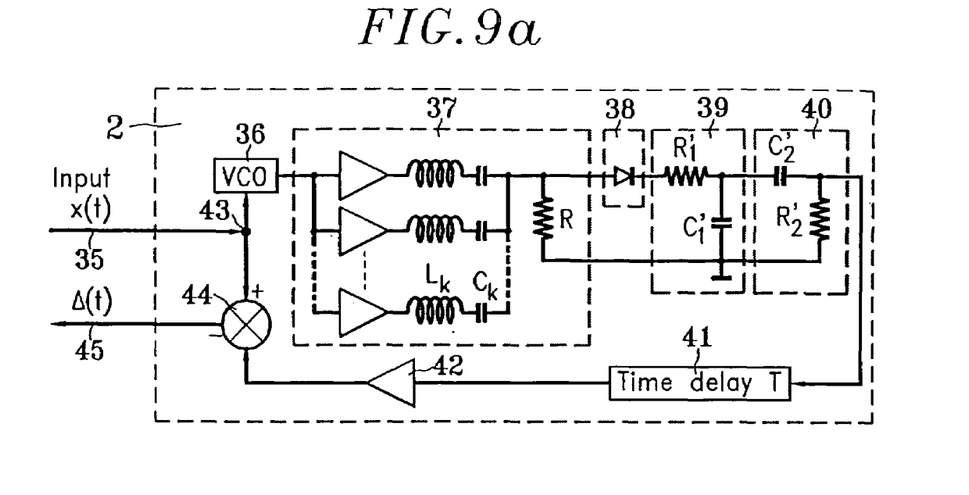
Figure 9B:
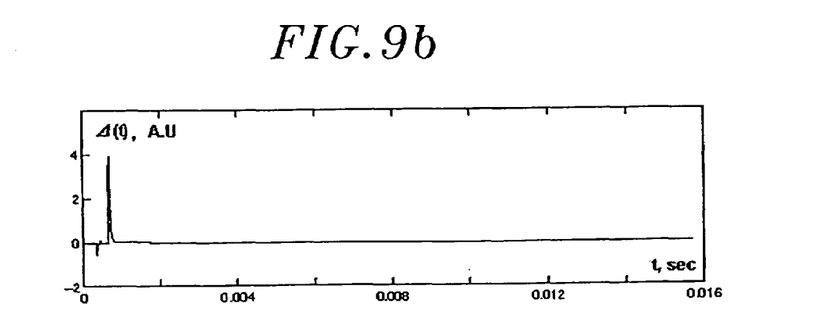
FIG. 9b is a graph plotting the signal Δ(t) obtained at the outlet from the decryption module when s(t)=0.
Figure 9C:
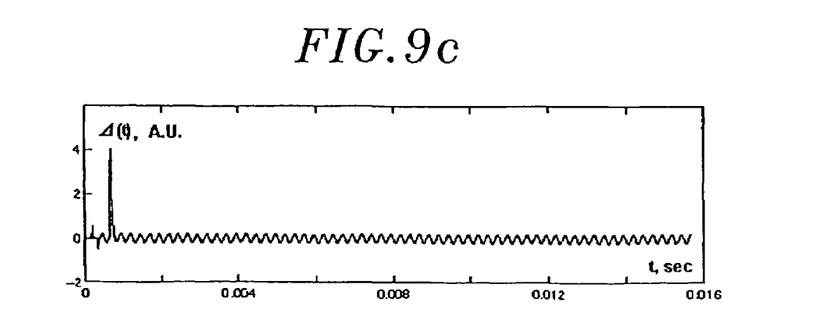
FIG. 9c is a graph plotting the signal Δ(t) obtained at the outlet from the decryption module when s(t) is a sinewave signal.

FIGS. 8 and 9 describe implementations of an electronic encryption module and of an electronic decryption module adapted to voice signal coding for a radio communications application.

a) Implementation of the Encryption Module (FIG. 8a)

This module comprises:

a VCO 26 whose emission frequency f(t) is tunable by an input voltage x(t): f(t)=αx(t) where α is the frequency tuning rate of the VCO as a function of the voltage x (in an embodiment, α=2.27 MHz/V with a frequency excursion in the band 25 MHz–55 MHz);

a non-linear circuit 27 formed by K resonant circuits ($L_k$ $C_k$) connected in parallel, the response NL of the non-linear circuit 27 being as follows:

$$NL(x) = \sum_{k=1}^{K} \frac{1}{\sqrt{1+Q_k^2(1-\gamma_k^2)^2}}$$

where:

$Q_k = L_k[\omega_0 + \alpha.x(\tau)]/R$ $\gamma_k = [\omega_0 + \alpha.x(\tau)]/R$ $\omega_0$ = the angular frequency of the VCO $\omega_k = \sqrt{1/L_k C_k}$ = the angular frequency at which the resonance circuit k is resonant.

The frequency response NL(f) have K resonance peaks centered on the resonance angular frequencies $\omega_k = 2\pi f_k = \sqrt{1/L_k C_k}$.

FIG. 8b shows the function NL(f) that is obtained when there are K=5 resonant circuits [$L_{1=3.8}$ μH, $L_2=L_3=L_4=4$ μH, $L_{5=5}$ μH and $C_1=2.4$ pF, $C_2=2.9$ pF, $C_3=4$ pF, $C_{4=5.4}$ pF, $C_5=6.4$ pF, and R=10 Ω]. The function NL(f) has five peaks centered on the resonance frequencies of each of the resonant circuits: 28 MHz, 34 MHz, 40 MHz, 47 MHz, and 53 MHz;

a detector 28 constituted by a diode having the effect of transforming the signal f(t) of amplitude NL[f(t)] from the circuit 27 into an amplitude modulated signal;

a bandpass filter 29 constituted by a bandpass filter $R'_1 C'_1$ having a cutoff frequency:

$f_1 = 1/2\pi\sqrt{R'_1 C'_1}$ followed by a highpass filter 30 $R'_2 C'_2$ having a cutoff frequency $f_2 = 1/2\pi\sqrt{R'_2 C'_2}$.

In an embodiment, $R'_1 = 10$ Ω, $R'_2 = 100$ Ω, $C'_{1=5.3}$ μF, and $C'_2 = 0.32$ μf, $f_1 = 3$ kHz, and $f_2 = 5$ kHz, corresponding to a bandpass filter having a band width $\Delta f = f_2 - f_1 = 2$ kHz;

a digital delay line 31 introducing a delay T (where T=1 ms);

an amplifier 32 enabling the feedback look gain to be adjusted (i.e. for adjusting the value of the bifurcation parameter β, where β is typically approximately 380);

a mixer 33 placed at the outlet from the bandpass filter and enabling the message s(t) to be added to the signal propagating in the feedback loop;

an extractor 34 enabling the chaotic signal propagating in the feedback loop to be sampled so as to send it over the transmission channel 35. The signal taken at 34 constitutes the encrypted signal shown in FIG. 8c. FIG. 8d shows the spectrum of the encrypted signal which can be compared in the figure with the passband (drawn in dashed lines) of the bandpass filter formed by the above-described elements 29 and 30. FIG. 8e shows the self-correlation function of the chaotic signal of FIG. 8c. The presence of a narrow correlation peak confirms the random character of the chaotic signal. It should be observed that the type of statistics followed by the chaotic signal can be modified by changing the parameters of the circuit, such as the value of the delay T, the value of the bifurcation parameter β, the non-linear function NL, or indeed the shape of the bandpass filter. The type of statistics of the chaotic signal can thus be matched to that which is accepted by standard vocoders in mobile telephony applications.

In another version, the non-linear means 27 can be formed by crystal oscillators, or RTD diodes presenting one or more transmission peaks.

In another version, the message s(t) can be applied directly to the delay means 31 so as to modify the value of the delay T. This solution is particularly advantageous when the signal s(t) is a digital signal.

b) Implementation of the Decoding Module (FIG. 9)

FIG. 9a shows an embodiment of a decoder matching the encoder of FIG. 8a. The components 36 to 42 are identical to the components 27 to 32 of FIG. 8a.

The encrypted signal coming from the transmission channel 35 is applied to the input 43 of the VCO 36. The subtracter 44 takes the difference between the encrypted chaotic signal coming from the transmission channel 35 and the chaotic signal obtained at the output from the amplifier 42. The difference signal Δ(t) obtained at the output 45 of the subtracter 44 gives the decrypted message s(t).

FIG. 9b is an experimental reading of the output signal Δ(t) obtained with the above-described circuits when no message s(t) is applied to the input of the encoder of FIG. 8a (s(t)=0). There is then perfect synchronization between the sender and the receiver, the difference Δ(t) between the chaos produced by the sender and that produced by the receiver is nil. FIG. 9c shows Δ(t) when s(t) is a sinewave signal 4 kHz, having an amplitude that is 1% of the chaos used for masking it.

In the other version, when a digital signal s(t) is applied to the delay line 31 and modifies the value of the delay T in the sender, the signal Δ(t) is nil (FIG. 8a) for bit "0" (synchronization between the emitter and the receiver), and is chaotic for bit "1" (the sender and the receiver are no longer synchronized).

The device can be used in particular for making signals secure in frequency bands that are as narrow as 5 kHz, in particular for applications to analog or digital voice transmission. After the message (or voice) has been encrypted in the form of analog chaos as in the above example, the encrypted signal can be converted into digital form by conventional analog-to-digital converter means. The encrypted signal is then encoded in the form of digital chaos constituted by a chaotic sequence of bits, e.g. at a typical data rate of 100 kbits/s in the context of present standards.

After being conveyed to the receiver, the receiver converters the encrypted digital signal into an analog signal by conventional digital-to-analog conversion means and uses the FIG. 9 receiver module for decrypting it.

It should also be observed that the message s(t) can itself be a digital signal obtained by digitizing voice on input to the encoder.

All known transmission means (by amplitude modulation, frequency modulation, phase modulation, frequency transposition) can equally well be used to convey the above analog or digital encrypted signals between an encoding module and a receiver module.

Figure 10:
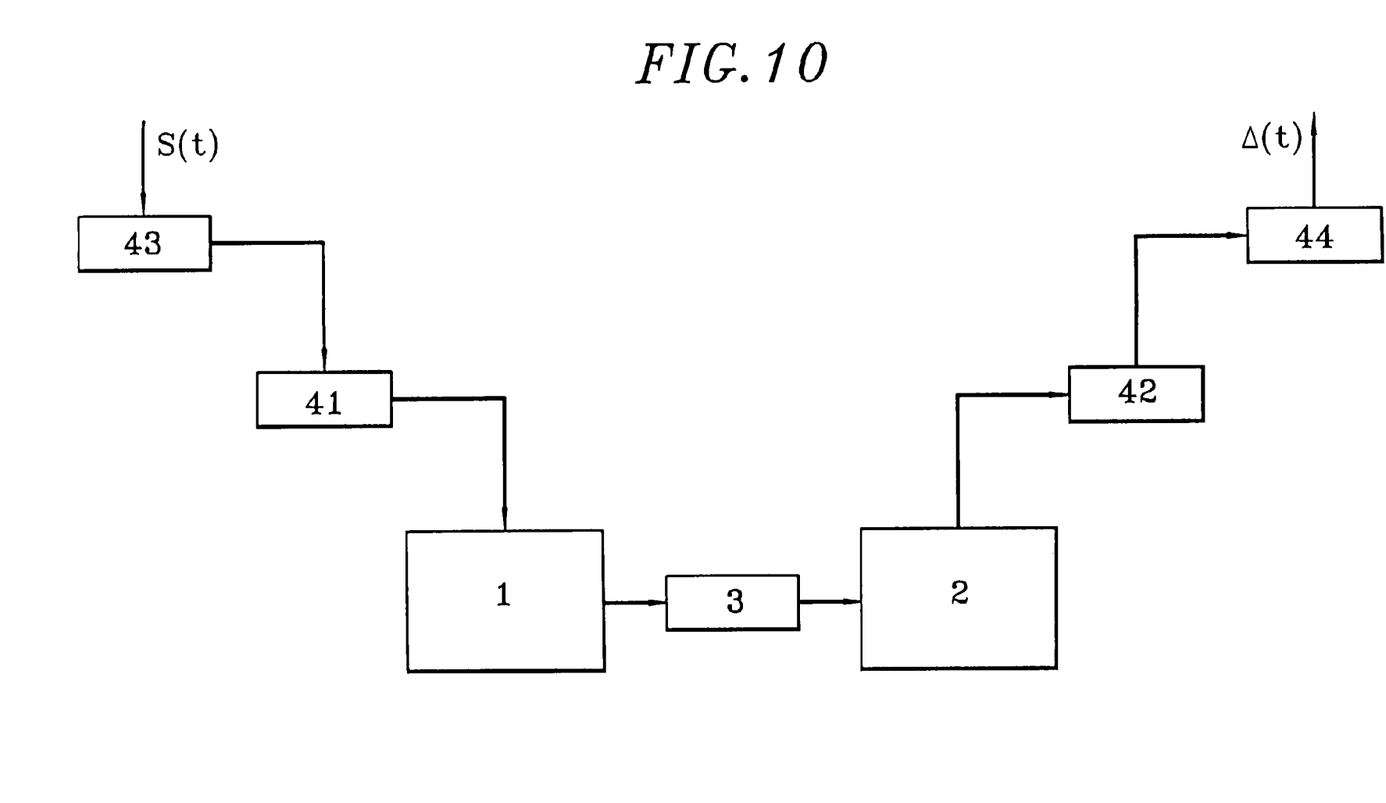
FIG. 10 is a block diagram of a system implementing superencryption, constituted by a plurality of encoding and decoding modules in cascade for the purpose of increasing confidentiality.

FIG. 10 also shows that it is possible to increase the degree of security of the device. Since the decrypted signal Δ(t) obtained at the outlet from the FIG. 9a decoding module reproduces exactly the signal s(t) applied to the inlet of the encoding module of FIG. 8a, it is quite possible to use a plurality of encoding modules constituted by chaos generators connected in cascade for encoding the message s(t), thereby increasing the complexity of the chaos delivered by the sender.

The decryption module is then constituted by a plurality of demodulation stages connected in cascade, each formed by the same chaos generators as are used in the modulation stages. As an illustration, FIG. 10 corresponds to the case where two modulation stages 41 and 42 and two demodulation stages 42 and 44 are used to increase the degree of security of the initial device. The bandwidth of the chaos generated by each of these additional modulation and demodulation stages must be narrower than that of the chaos generators 1 and 2 used in the sender system and in the receiver system. This makes it possible to obtain very great complexity in the chaotic signal encrypting information in the transmission channel 3.

The invention claimed is:

1. A sender device for sending an encrypted information signal, the device comprising:
    means for generating chaotic signals comprising
        a source producing a chaotic signal and provided with a feedback loop comprising means for generating time delay, and a non-linear circuit element,
    means for producing the encrypted information signal comprising
        a mixer circuit element to inject an information signal to encrypt the information signal, received on one input, into the chaotic signal propagating in the feedback loop, received on another input,
    wherein the feedback loop includes means for filter-forming to limit the spectrum of the chaotic signal to one or more spectrum bands to allow the sender to directly transmit the chaotic signal obtained from the feed back loop, and the encrypted information signal enables a receiver device to be self-synchronized.

2. The sender device according to claim 1, wherein said means for filter-forming disposed in the feedback loop present a transfer function which distributes the chaotic signal statistically over a given spectral profile.

3. The sender device according to claim 1, wherein the means for filter-forming disposed in the feedback loop comprise a bandpass filter.

4. The sender device according to claim 3, wherein a passband of said filter covers a spectral band of the information signal to be encrypted, having a bandwidth that is slightly greater than that of said spectral band.

5. A sender device for emitting an encrypted information signal, the device having a plurality of sender modules in cascade, each being constituted by a device according to claim 1.

6. A receiver device for receiving an encrypted information signal, the device comprising means for receiving said signal, and
    a feedback loop comprising means for delayline-forming and a non-linear circuit element, wherein in order to receive an information signal encrypted by a device according to claim 1, the feedback loop includes means for filter-forming whose characteristics are identical to those of the means for filter-forming in the feedback loop of the sender device.

7. A receiver device for receiving an information signal encrypted by a sender device comprising a plurality of sender modules, each being constituted by a device according to claim 1, the receiver device comprising a plurality of receiver modules in cascade, the number of these modules being the same as the number of modules in the sender device, means for filter-forming in feedback loops of the receiver modules having characteristics that are identical to those of means for filter-forming in a feedback loop of the sender modules.

8. A sender/and or receiver device for an encrypted information signal for transmission by radio over a voice signal carrier, the device including a device according to claim 1.

9. A transmission system for transmitting encrypted information signals, the system comprising a sender device according to claim 1, a complementary receiver device, and a unique transmission channel between said sender device and said receiver device.

10. A radio transmission system for transmitting encrypted information signals, the system comprising a sender device according to claim 1, a complementary receiver device, and a transmission channel between said sender device and said receiver device, said transmission channel including means for analog-to-digital converting and means for digital-to-analog converting respectively downstream and upstream from the sender device and from the receiver device.

* * * * *